United States Patent
Holl et al.

(10) Patent No.: US 9,733,388 B2
(45) Date of Patent: Aug. 15, 2017

(54) SYSTEMS AND METHODS FOR CONNECTIVITY ANALYSIS USING FUNCTIONAL OBJECTS

(75) Inventors: James E. Holl, Houston, TX (US); Yao-Chou Cheng, Houston, TX (US); Mark W. Dobin, The Woodlands, TX (US)

(73) Assignee: ExxonMobil Upstream research Company, Houston, TX (US)

(*) Notice: Subject to any disclaimer, the term of this patent is extended or adjusted under 35 U.S.C. 154(b) by 1878 days.

(21) Appl. No.: 12/920,275

(22) PCT Filed: Mar. 24, 2009

(86) PCT No.: PCT/US2009/038111
§ 371 (c)(1),
(2), (4) Date: Nov. 23, 2010

(87) PCT Pub. No.: WO2009/137176
PCT Pub. Date: Nov. 12, 2009

(65) Prior Publication Data
US 2011/0063292 A1    Mar. 17, 2011

Related U.S. Application Data

(60) Provisional application No. 61/126,471, filed on May 5, 2008.

(51) Int. Cl.
*G06T 17/00* (2006.01)
*G01V 11/00* (2006.01)
(Continued)

(52) U.S. Cl.
CPC .............. *G01V 11/00* (2013.01); *E21B 49/00* (2013.01); *G01V 99/005* (2013.01); *G01V 2210/66* (2013.01); *G01V 2210/663* (2013.01)

(58) Field of Classification Search
None
See application file for complete search history.

(56) References Cited

U.S. PATENT DOCUMENTS

| | | | |
|---|---|---|---|
| 4,809,240 A | 2/1989 | Mufti | |
| 4,972,383 A | 11/1990 | Lailly | |

(Continued)

FOREIGN PATENT DOCUMENTS

| | | |
|---|---|---|
| GB | 2145508 | 3/1985 |
| WO | WO 2006/127151 | 11/2006 |

(Continued)

OTHER PUBLICATIONS

U.S. Appl. No. 12/747,778, filed Jun. 11, 2010, Kim et al.

(Continued)

*Primary Examiner* — Andrew G Yang
(74) *Attorney, Agent, or Firm* — ExxonMobil Upstream Research-Law Department

(57) ABSTRACT

Systems and methods which utilize functional objects in connectivity analysis are shown. Functional objects may be denoted by a geological feature, a user-defined location, a critical point in a connection network, a region within a 3D volume, etc. Each functional object preferably possesses and/or has associated therewith an ability to obtain information such as relevant connection pathways, linked regions of interest, statistical connection information, etc. Such functional objects may have dynamic regions associated therewith, such as to define an area of uncertainty, for facilitating exploring connectivity. Desired connectivity information can be revealed interactively from within a confusing web of connection pathways through use of the functional objects. Through interactive manipulation of functional objects analysis may be refined or revised. Additionally or alternatively, logical operations may be applied (Continued)

with respect to one or more functional objects to extend or reduce the connectivity of interest.

21 Claims, 5 Drawing Sheets

(51) Int. Cl.
*E21B 49/00* (2006.01)
*G01V 99/00* (2009.01)

(56) References Cited

U.S. PATENT DOCUMENTS

| | | | |
|---|---|---|---|
| 5,018,112 A | 5/1991 | Pinkerton et al. | |
| 5,040,414 A | 8/1991 | Graebner | |
| 5,159,833 A | 11/1992 | Graebner et al. | |
| 5,444,619 A | 8/1995 | Hoskins et al. | |
| 5,586,082 A | 12/1996 | Anderson et al. | |
| 5,757,663 A * | 5/1998 | Lo et al. | 702/6 |
| 5,798,982 A | 8/1998 | He et al. | |
| 5,835,882 A | 11/1998 | Vienot et al. | |
| 5,862,513 A | 1/1999 | Mezzatesta et al. | |
| 6,002,985 A | 12/1999 | Stephenson | |
| 6,012,018 A | 1/2000 | Hornbuckle | |
| 6,052,650 A | 4/2000 | Assa et al. | |
| 6,128,577 A | 10/2000 | Assa et al. | |
| 6,236,942 B1 | 5/2001 | Bush | |
| 6,246,963 B1 | 6/2001 | Cross et al. | |
| 6,313,837 B1 * | 11/2001 | Assa et al. | 345/420 |
| 6,393,906 B1 | 5/2002 | Vityk et al. | |
| 6,401,042 B1 | 6/2002 | Van Riel et al. | |
| 6,411,903 B2 | 6/2002 | Bush | |
| 6,490,528 B2 | 12/2002 | Cheng et al. | |
| 6,514,915 B1 | 2/2003 | Beyer et al. | |
| 6,516,274 B2 | 2/2003 | Cheng et al. | |
| 6,549,879 B1 | 4/2003 | Cullick et al. | |
| 6,574,565 B1 | 6/2003 | Bush | |
| 6,618,678 B1 | 9/2003 | Van Riel | |
| 6,661,000 B2 | 12/2003 | Smith et al. | |
| 6,674,689 B2 | 1/2004 | Dunn et al. | |
| 6,690,820 B2 | 2/2004 | Lees et al. | |
| 6,754,588 B2 | 6/2004 | Cross et al. | |
| 6,754,589 B2 | 6/2004 | Bush | |
| 6,810,332 B2 | 10/2004 | Harrison | |
| 6,823,266 B2 | 11/2004 | Czernuszenko et al. | |
| 6,826,483 B1 | 11/2004 | Anderson et al. | |
| 6,901,391 B2 | 5/2005 | Storm, Jr. et al. | |
| 6,912,467 B2 | 6/2005 | Schuette | |
| 6,928,367 B2 * | 8/2005 | Gray et al. | 702/11 |
| 6,950,751 B2 | 9/2005 | Knobloch | |
| 6,985,841 B2 | 1/2006 | Barroux | |
| 6,987,878 B2 | 1/2006 | Lees et al. | |
| 6,989,841 B2 | 1/2006 | Docherty | |
| 6,993,434 B2 | 1/2006 | Cheng et al. | |
| 7,013,218 B2 | 3/2006 | Baker et al. | |
| 7,024,021 B2 | 4/2006 | Dunn et al. | |
| 7,092,824 B2 | 8/2006 | Favret et al. | |
| 7,113,869 B2 | 9/2006 | Xue | |
| 7,124,030 B2 | 10/2006 | Ellis | |
| 7,174,254 B2 | 2/2007 | Ellis | |
| 7,210,342 B1 | 5/2007 | Sterner et al. | |
| 7,249,009 B2 | 7/2007 | Ferworn et al. | |
| 7,297,661 B2 | 11/2007 | Beyer et al. | |
| 7,330,791 B2 | 2/2008 | Kim et al. | |
| 7,337,660 B2 | 3/2008 | Ibrahim et al. | |
| 7,344,889 B2 | 3/2008 | Kelemen et al. | |
| 7,387,021 B2 | 6/2008 | DiFoggio | |
| 7,395,691 B2 | 7/2008 | Sterner et al. | |
| 7,415,401 B2 | 8/2008 | Calvert et al. | |
| 7,520,158 B2 | 4/2009 | DiFoggio | |
| 7,525,484 B2 | 4/2009 | Karr, Jr. et al. | |
| 7,526,418 B2 | 4/2009 | Pita et al. | |
| 7,529,626 B1 | 5/2009 | Ellis | |
| 7,565,243 B2 | 7/2009 | Kim et al. | |
| 7,584,086 B2 | 9/2009 | Frankel | |
| 7,743,006 B2 | 6/2010 | Woronow et al. | |
| 8,365,831 B2 | 2/2013 | Kim et al. | |
| 8,370,122 B2 | 2/2013 | Walker et al. | |
| 8,437,997 B2 | 5/2013 | Meurer et al. | |
| 8,727,017 B2 | 5/2014 | Hilliard et al. | |
| 8,762,442 B2 | 6/2014 | Jeong et al. | |
| 8,793,110 B2 | 7/2014 | Myers et al. | |
| 8,849,640 B2 | 9/2014 | Holl et al. | |
| 8,884,964 B2 | 11/2014 | Holl et al. | |
| 8,931,580 B2 | 1/2015 | Cheng et al. | |
| 9,022,129 B2 | 5/2015 | Dobin et al. | |
| 9,026,417 B2 | 5/2015 | Sequeira, Jr. et al. | |
| 9,026,418 B2 | 5/2015 | Kim et al. | |
| 9,123,161 B2 | 9/2015 | Adair et al. | |
| 9,169,726 B2 | 10/2015 | Snedden et al. | |
| 9,239,398 B2 | 1/2016 | Kim et al. | |
| 9,367,564 B2 | 6/2016 | Wood et al. | |
| 2001/0022558 A1 * | 9/2001 | Karr et al. | 342/450 |
| 2002/0013687 A1 | 1/2002 | Ortoleva | |
| 2002/0049575 A1 | 4/2002 | Jalali et al. | |
| 2002/0067373 A1 | 6/2002 | Roe et al. | |
| 2002/0099504 A1 | 7/2002 | Cross et al. | |
| 2002/0120429 A1 | 8/2002 | Ortoleva | |
| 2003/0200030 A1 | 10/2003 | Meldahl | |
| 2004/0020642 A1 | 2/2004 | Vinegar et al. | |
| 2004/0148147 A1 | 7/2004 | Martin | |
| 2004/0153247 A1 | 8/2004 | Czernuszenko et al. | |
| 2004/0210547 A1 | 10/2004 | Wentland et al. | |
| 2004/0220790 A1 | 11/2004 | Cullick et al. | |
| 2004/0254734 A1 | 12/2004 | Zabalza-Mezghani et al. | |
| 2005/0043891 A1 | 2/2005 | Bush | |
| 2005/0096893 A1 | 5/2005 | Feraille et al. | |
| 2005/0149307 A1 | 7/2005 | Gurpinar et al. | |
| 2005/0171700 A1 | 8/2005 | Dean | |
| 2005/0199391 A1 | 9/2005 | Cudmore et al. | |
| 2005/0209866 A1 | 9/2005 | Veeningen et al. | |
| 2005/0209912 A1 | 9/2005 | Veeningen et al. | |
| 2005/0213809 A1 | 9/2005 | Lees et al. | |
| 2005/0234690 A1 | 10/2005 | Mainguy et al. | |
| 2005/0256647 A1 | 11/2005 | Ellis | |
| 2006/0014647 A1 | 1/2006 | Beyer et al. | |
| 2006/0041409 A1 | 2/2006 | Strebelle et al. | |
| 2006/0047489 A1 | 3/2006 | Scheidt et al. | |
| 2006/0052938 A1 | 3/2006 | Thorne et al. | |
| 2006/0092766 A1 | 5/2006 | Shelley et al. | |
| 2006/0235666 A1 | 10/2006 | Assa et al. | |
| 2006/0235667 A1 | 10/2006 | Fung et al. | |
| 2006/0235668 A1 | 10/2006 | Swanson et al. | |
| 2006/0241867 A1 | 10/2006 | Kuchuk et al. | |
| 2006/0265204 A1 | 11/2006 | Wallis et al. | |
| 2006/0277012 A1 | 12/2006 | Ricard et al. | |
| 2006/0277013 A1 | 12/2006 | Bennis et al. | |
| 2006/0282243 A1 | 12/2006 | Childs et al. | |
| 2006/0287201 A1 | 12/2006 | Georgi et al. | |
| 2006/0293872 A1 | 12/2006 | Zamora et al. | |
| 2007/0005253 A1 | 1/2007 | Fornel et al. | |
| 2007/0011646 A1 | 1/2007 | Chrisochoides et al. | |
| 2007/0013690 A1 | 1/2007 | Grimaud et al. | |
| 2007/0016389 A1 | 1/2007 | Ozgen | |
| 2007/0027666 A1 * | 2/2007 | Frankel | 703/10 |
| 2007/0143024 A1 | 6/2007 | Michel et al. | |
| 2007/0156377 A1 | 7/2007 | Gurpinar et al. | |
| 2007/0219724 A1 | 9/2007 | Li et al. | |
| 2007/0219725 A1 | 9/2007 | Sun et al. | |
| 2007/0242564 A1 | 10/2007 | Devi | |
| 2007/0265778 A1 | 11/2007 | Suter et al. | |
| 2007/0294034 A1 * | 12/2007 | Bratton et al. | 702/6 |
| 2008/0040086 A1 | 2/2008 | Betancourt et al. | |
| 2008/0059140 A1 | 3/2008 | Salmon et al. | |
| 2008/0097735 A1 | 4/2008 | Ibrahim et al. | |
| 2008/0099241 A1 | 5/2008 | Ibrahim et al. | |
| 2008/0147326 A1 | 6/2008 | Ellis | |
| 2008/0173804 A1 | 7/2008 | Indo et al. | |
| 2009/0071239 A1 | 3/2009 | Rojas et al. | |
| 2010/0191516 A1 | 7/2010 | Benish et al. | |
| 2010/0206559 A1 | 8/2010 | Sequeira, Jr. et al. | |
| 2010/0252270 A1 | 10/2010 | Kim et al. | |
| 2010/0270027 A1 | 10/2010 | Kim et al. | |
| 2011/0044532 A1 | 2/2011 | Holl et al. | |

(56) References Cited

U.S. PATENT DOCUMENTS

| | | |
|---|---|---|
| 2011/0063292 A1 | 3/2011 | Holl et al. |
| 2011/0112802 A1 | 5/2011 | Wilson et al. |
| 2011/0153300 A1 | 6/2011 | Holl et al. |
| 2011/0247829 A1 | 10/2011 | Dobin et al. |
| 2011/0259598 A1 | 10/2011 | Hilliard et al. |
| 2012/0150449 A1 | 6/2012 | Dobin |
| 2012/0166166 A1 | 6/2012 | Czernuszenko |
| 2012/0285701 A1 | 11/2012 | Cheng et al. |
| 2013/0112407 A1 | 5/2013 | Cheng et al. |
| 2013/0121111 A1 | 5/2013 | Kim et al. |
| 2013/0140037 A1 | 6/2013 | Sequeira, Jr. et al. |
| 2013/0179136 A1 | 7/2013 | Tiwari et al. |
| 2013/0317798 A1 | 11/2013 | Cheng et al. |
| 2013/0338984 A1 | 12/2013 | Braaksma et al. |
| 2013/0338987 A1 | 12/2013 | Cheng et al. |
| 2014/0278117 A1 | 9/2014 | Dobin et al. |
| 2014/0278305 A1 | 9/2014 | Jeong et al. |
| 2014/0365192 A1 | 12/2014 | Cheng et al. |
| 2015/0049084 A1 | 2/2015 | Cheng et al. |
| 2015/0094994 A1 | 4/2015 | Sequeira, Jr. et al. |
| 2015/0117143 A1 | 4/2015 | Dobin et al. |
| 2015/0219793 A1 | 8/2015 | Li et al. |
| 2016/0003008 A1 | 1/2016 | Uribe et al. |
| 2016/0090825 A1 | 3/2016 | Imhof et al. |

FOREIGN PATENT DOCUMENTS

| | | |
|---|---|---|
| WO | WO 2007/007210 | 1/2007 |
| WO | WO 2007/063442 | 6/2007 |
| WO | WO 2007/106244 | 9/2007 |
| WO | WO 2008/100614 | 8/2008 |
| WO | WO 2009/079123 | 6/2009 |
| WO | WO 2009/094064 | 7/2009 |
| WO | WO 2010/008647 | 1/2010 |

OTHER PUBLICATIONS

Ainsworth, R.B., (2005) "Sequence Stratigraphic-Based Analysis Of Depositional Architecture—A Case Study From A Marginal Marine Depositional Setting," *Petro. Geoscience*, v. 11, pp. 257-276.
Allen, J.R.L., (1978), "Studies in Fluviatile Sedimentation; An Exploratory Quantitative Model For The Architecture Of Avulsion-Controlled Alluvial Sites," *Sedimentary Geology*, v. 21(2), pp. 129-147.
Barton, M., et al., (2004), "Understanding Hydrocarbon Recovery In Deepwater Reservoirs; Modeling Outcrop Data In The Third Dimension," *AAPG*, v. 13, pp. 11.
Bharat, K. et al. (2001), "Who Links to Whom: Mining Linkage between Web Sites", Proceedings of the 2001 IEE Int'l. Conf. on Data Mining, pp. 51-58.
Crawfis, R. et al. (1992), "Direct volume visualization of three-dimensional vector fields", Proceedings of the 1992 Workshop on Volume Visualization, pp. 55-60.
Deo, Narsingh, "Graph Theory with Application to Engineering and Computer Science", Prentice-Hall Inc., pp. 1-11.
Dijkstra, E.W. (1959), "A Note On Two Problem in Connection with Graphs", *Numerische Mathematic* 1, pp. 269-271.
Elshahawi, H., et al (2000) "Correcting for Wettability and Capillary Pressure Effects On Formation Tester," SPE 63075.
Firoozabadi, A., et al. (1998), "Surface Tension Of Water-Hydrocarbon Systems At Reservoir Conditions," *J. of Canadian Petro. Tech., Reservoir Engineering*, v. 41, 8 pgs.
Fowler, J. et al. (2000), "Simultaneous Inversion of the Ladybug prospect and derivation of a lithotype volume", 2000 SEG Expanded Abstracts, 3 pgs.
Gainski, M. et al., (2008) "The Schiehallion Field: Detection Of Reservoir Compartmentalisation and Identification Of New Infill Targets Using 4D Seismic Surveys and Dynamic Production Data, Reservoir Compartmentalization", [Online], pp. 32. Retrieved from the Internet: URL:http//www.geolsoc.org.uk/webdav/site/GSL/shared/pdfs/events/abstracts/Reservoir AbstractBook.pdf.
Gibson D. et al. (2005), Discovering Large Dense Subgraphs in Massive Graphs, Proceedings of the 31$^{st}$ VLDB Conf., Trondheim, Norway, pp. 721-732.
Hampson, M. et al. (2002), "Detection of Functional Connectivity Using Temporal Correlations in MR Images", *Human Brain Mapping* 15, Part 4, pp. 247-262.
Heimemann, Z.E. et al. (2003), "Gridding Techniques for Reservoir Simulation", 7$^{th}$ Int'l. Form on Reservoir Simulation, Jun. 23-27, 2003, Burhlerhohe, Germany, pp. 1-100.
Hirsh, L.M. et al. (1999), "Graph theory applications to continuity and ranking in geologic models", *Computers & Geosciences* 25, pp. 127-139.
James, W.R. et al. (2004), "Fault-Seal Analysis Using A Stochastic Multi-Fault Approach," *AAPG Bulletin*, v. 88(7), pp. 885-904.
Justwan, H., et al., "Characterization Of Static and Dynamic Reservoir Connectivity For The Ringhorne Field, Through Integration Of Geochemical and Engineering Data," Reservoir Compartmentalization, 1 pg.
Justwan, H.K., et al. (2008), "Unraveling Dynamic Fluid Connectivity Through Time-Lapse Geochemistry—From Example From the Ringhorne Field, Norway," AAPG Int'l Conf and Exhibition, Cape Town, South Africa 2008.
King, P.R. (1990), "The Connectivity and Conductivity Of Overlapping Sand Bodies," The Norwegian Institute of Technology (Graham & Trotrnan), pp. 353-362.
Larue, D.K., et al. (2006), "Connectivity Of Channelized Reservoirs: A Modeling Approach," *Petro. Geoscience*, v. 12, pp. 291-308.
Lescoffit, G.,et al. (2005), "Quantifying The Impact Of Fault Modeling Parameters On Production Forecasting For Clastic Reservoirs," *AAPG Hedberg Series*, No. 2, pp. 137-149.
McCain, W.D., Jr. (1991), "Reservoir-Fluid Property Correlations—State Of The Art," *SPERE*, p. 266.
Manzocchi, T., et al. (2008), "Sensitivity Of The Impact Of Geological Uncertainty On Production From Faulted And Unfaulted Shallow-Marine Oil Reservoirs: Objectives And Methods," *Petro. Geoscience*, v. 14, pp. 3-15.
Mlacnik, M.J. et al. (2001), "Using Well Windows in Full Field Reservoir Simulation", SPE 66371, SPE Reservoir Simulation Symposium, Feb. 11-14, 2001, 8 pgs.
Mlacnik, M.J. et al. (2003), "Locally Streamline-Pressure-Potential-Based PEBI Grids", SPE 79684, SPE Reservoir Simulation Symposium, Feb. 3-5, 2003, 12 pgs.
Richards, B., et al. (2008), "Reservoir Connectivity Analysis Of A Complex Combination Trap Terra Nova Field, Jeanne d'Arc Basin, Newfoundland, Canada," Reservoir Compartmentalization, London Geological Society, p. 59.
Sales, J.K. (1997), "Seal Strength Vs. Trap Closure; A Fundamental Control On The Distribution Of Oil And Gas, In: Seals, Traps, And The Petroleum System," *AAPG*, v. 67, pp. 57-83.
Schlumberger (2004), "Managing Uncertainty In Oilfield Reserves," *Middle East Well Evaluation Review*, v. 12, II pgs.
Sethian J.A. (1996), "Level set methods and fast marching methods", Cambridge University Press, pp. 284-286.
Stright, L. (2005), "Modeling, Upscaling and History Matching Thin, Irregularly-Shaped Flow Barriers: A Comprehensive Approach for Predicting Reservoir Connectivity," 2005 SPE Annual Tech. Conf. & Exh., Oct. 24-27, 2005, 8 pgs.
Snedden, J.W., et al. (2007), "Reservoir Connectivity: Definitions, Examples And Strategies,"IPTC 375, Int'l. Petro. Tech. Conf., Dubai, UAE, Dec. 4-6, 2007, 6 pgs.
Sumpter, L., et al. (2008), "Early Recognition Of Potential Reservoir Compartmentalization" Reservoir Compartmentalization, London Geological Society, Mar. 5-6, 2008, p. 84.
Sweet, M.L., et al. (2007), "Genesis Field, Gulf Of Mexico: Recognizing Reservoir Compartments On Geologic And Production Timescales In Deep-Water Reservoirs," *AAPG*, v. 91, pp. 1701-1729.
Vrolijk, P.J., et al. (2005), "Reservoir Connectivity Analysis—Defining Reservoir Connections And Plumbing," SPE 93577, 23 pgs.

(56) References Cited

OTHER PUBLICATIONS

*European Search Report*, dated Dec. 19, 2008, EP 0859627.2.
*International Search Report & Written Opinion*, dated May 5, 2009, PCT/US2009/038111.
*International Search report and Written Opinion*, dated Mar. 13, 2009, PCT/US2009/031578.

\* cited by examiner

SYSTEMS AND METHODS FOR CONNECTIVITY ANALYSIS USING FUNCTIONAL OBJECTS

CROSS-REFERENCE TO RELATED APPLICATION

This application claims the benefit of U.S. Provisional Patent Application 61/126,471 filed May 5, 2008 entitled SYSTEMS AND METHODS FOR CONNECTIVITY ANALYSIS USING FUNCTIONAL OBJECTS, the entirety of which is incorporated by reference herein.

TECHNICAL FIELD

The invention relates generally to connectivity analysis and, more particularly, to using functional objects in providing connectivity analysis.

BACKGROUND OF THE INVENTION

In the geosciences, it is not uncommon to generate models of geologic areas of interest in order to study or analyze various aspects of the geologic structure. Such models may represent various surface and/or subsurface structures. For example, when utilized with respect to hydrocarbon exploration and production, models are often generated of subsurface regions for use in identifying structures associated with hydrocarbon reservoirs, determining fluid migration characteristics, estimating hydrocarbon reserves, etc. Such models may be based upon data provided by data collection techniques such as seismic testing, geologic measurement, reservoir monitoring, simulation, etc.

An underlying geologic data set or data volume, as may be provided using one of the foregoing data collection techniques, may be processed to provide connection pathway information. For example, a web of connection pathways may be derived from geologic data sets using various techniques such as volume-based methods (e.g., multi-level seed-growing methods and fast marching methods) and network-based methods (e.g., shortest-path methods). Detail with respect to using such techniques to identify connected pathways within geologic dat a volumes is provided in U.S. Pat. No. 6,823,266 entitled "Method for Performing Object-Based Connectivity Analysis in 3-D Seismic Data Volumes," United States patent application publication number 2007/0027666 entitled "Characterizing Connectivity in Reservoir Models Using Paths of Least Resistance," and World Intellectual Property Organization international publication number WO2006/127151 entitled "A Rapid Method for Reservoir Connectivity Analysis Using a Fast Marching Method," the disclosures of which are hereby incorporated herein by reference.

The results of the foregoing techniques often provide a web of hundreds of connection pathways for various locations within the data volumes. These connection pathways are commonly represented geometrically as polylines in a graphical representation of the data volume (e.g., a three-dimensional (3D) Earth model of the geographic area of interest represented by the data set). For example, to facilitate connectivity analysis within the geographic area of interest a 3D Earth model image is displayed with a static connection pathways map thereon. The connection pathways may be represented by a group of geometrical polylines, wherein polyline shows the connection from one geological locations to another.

Other practices utilize a connected volume technique in which a vector is stored in each cell/voxel indicating a connection pathway to a connected neighboring cell/voxel. In this kind of connection pathway representation, an interactive streamline display may be used to show the connected relations among given points of interests within the connected volume. Detail with respect to the representation of connection pathways using connected volumes is provided in Crawfis, R and Max, Nelson "Direct volume visualization of three-dimensional vector fields," Proceedings of the 1992 workshop on Volume visualization, the disclosure of which is incorporated herein by reference.

Useful analysis of the connection pathways within a geologic model (e.g., 3D Earth model) involves identification particular connection pathways and an understanding of the interaction or interrelationship of such connection pathways with various data objects in the model. However, the large number of connection pathways generally makes it to difficult to effectively interpret the connectivity results and to focus on the specific paths of most relevance to the analysis that the geoscientist or engineer wishes to perform. For example, a user presented with hundreds of connection pathways may be required not only to visually identify connection pathways of interest within a confusing web of connection pathways, but also to conclude which connection pathway or pathways are relevant to a particular line of analysis. Even upon visually identifying a particular connection pathway within a mass of connection pathways, the relevance of that particular connection pathway to a line of analysis may not be immediately apparent in the foregoing visual representations, such as due to interaction between the connection pathways and data objects, interaction between the connection pathways themselves, etc.

BRIEF SUMMARY OF THE INVENTION

The present invention is directed to systems and methods which utilize functional objects in connectivity analysis. Functional objects used in providing connectivity analysis according to embodiments of the invention have dynamic regions associated therewith, such as to define an area of uncertainty, for facilitating exploring connectivity. Functional objects may be denoted by a geological feature, a user-defined location, a critical point in a connection network, a region within a 3D volume, etc. Each functional object preferably possesses and/or has associated therewith an ability to obtain information such as relevant connection pathways, linked regions of interest, statistical connection information, etc.

Such functional objects may be utilized with respect to a modeled space visualization environment, such as a 3D Earth model visualization environment, to allow for interactive analysis of connectivity within the modeled space. For example, connectivity may be estimated by the concurrent connections of spatial regions within a modeled space. Desired connectivity information or identification of connection pathways of interest (referred to herein as a network of interest) can thus be revealed interactively from within a confusing web of connection pathways through use of the functional objects. For example, through interactive repositioning of a functional object (or set of functional objects) connections that pass through or nearby a specific location (e.g., a well path target or set of targets) may be identified. Additionally or alternatively, logical operations may be applied with respect to one or more functional objects to extend or reduce the connectivity of interest (e.g., pathways passing through a first functional object AND a second functional object).

Embodiments of the invention are particularly useful with respect to geological analysis, such as in association with hydrocarbon exploration and production. Understanding connectivity within a framework of a 3D Earth model is often desired for the management of an exploration and production asset (e.g., field, reservoir, well, etc.) from exploration to abandonment. Accordingly, connectivity within a 3D Earth model may be explored utilizing functional objects with dynamic regions within a 3D visualization environment according to embodiments of the invention. When utilized with respect to hydrocarbon exploration and production, functional objects of the present invention and connectivity analysis associated therewith may be used in analyzing hydrocarbon reservoirs, determining fluid migration characteristics, estimating hydrocarbon reserves, well path planning, platform location, reservoir management, etc.

According to embodiments of the invention, a model of a geologic area of interest is provided, wherein the model includes representations of geologic features and a plurality of connection pathways. One or more functional objects are preferably defined within this model for connection analysis according to embodiments of the invention. Such functional objects may be user defined (e.g., based upon a user selected location, user selected structural object, user selected connection pathway network topological feature, user selected region in the data volume, user issued logical query, etc.) or automatically identified (e.g., identified by relationship to a structural object, identified by connection pathway network topological feature, identified by a functional attribute relevant to the analysis to be performed, identified by a particular region in the data volume, identified by a particular characteristic, etc.), and preferably are associated with at least one functional attribute (e.g., connectivity associated with a particular structural object, associated with a particular connection pathway network feature, having a connectivity attribute meeting particular criteria, etc.) of the geologic area of interest. Using one or more such functional objects, a subset of connection pathways within the model may be identified, wherein connection pathways of this subset share some connectivity attribute associated with the functional object(s). For example, a subset of connection pathways may comprise relevant connection pathways for a given set of interpreted horizons, faults, wells and other geologic and engineering data objects. Thus connectivity within the geologic area of interest may be analyzed with respect to one or more functional attributes using the subset of connection pathways.

Functional objects of embodiments of the invention may be dynamically and interactively manipulated to refine or revise the analysis. For example, functional objects may be added, deleted, and/or repositioned within the model volume in order to change the subset of connection pathways identified, to revise a functional attribute of the analysis, to explore interaction of connection pathways and/or structural objects, etc. Similarly, dynamic regions associated with functional objects may be resized, reshaped, added, and/or deleted to change the subset of connection pathways identified.

Modeling data as may be used in deriving a model space or volume in which functional objects of embodiments of the invention are used may be provided by data collection techniques such as seismic testing, geologic measurement, reservoir monitoring, simulation, etc. Moreover, using the aforementioned dynamic regions of embodiments of the functional objects, embodiments of the present invention may be utilized with respect to model volumes derived from a plurality of modeling data. For example, a first and second model of a geologic area of interest may be provided, wherein the first model is derived from a data set provided by a first data collection technique (e.g., seismic data), and wherein the second model is derived from a data set provided by a second data collection technique (e.g., geologic measurement data). The first and second model may be different in many regards, such as being provided in a different scale, providing different levels of detail, etc. However, both the first and second model preferably include representations of geologic features within the geologic area of interest and have a plurality of connection pathways defined therein. The first and second models may be correlated using various points (e.g., structural features, connection pathway network topological features, etc.) within the first and second models to provide a correlated model of the geological area of interest. One or more functional objects are preferably defined within this correlated model, as discussed above, for connection analysis according to embodiments of the invention. Using one or more such functional objects, a subset of connection pathways within the correlated model may be identified. Connection pathways of this subset, although preferably sharing some connectivity attribute associated with the functional object(s), may be associated with the first or second model. Connectivity within the geologic area of interest may be analyzed with respect to one or more functional attributes using the subset of connection pathways.

Connection pathways utilized in connectivity analysis according to embodiments of the present invention may be in a number of forms. For example, embodiments of the invention facilitate interactive analysis of connectivity from streamline-based volumes, as well as geometry-based network results. Moreover, embodiments of the invention facilitate connectivity investigation using multiple connection topologies from various sources and algorithms.

From the above, it can be appreciated that embodiments of the invention provide for effective evaluation of multiple connectivity scenarios in multiple levels from various modeling sources. Embodiments facilitate dynamic analysis of critical points and critical paths for geological objects, and rapid visualization of connections through logical operations. The construct of functional objects and application of logical operations to identify networks of interest within a web of connection pathways as discussed above can provide considerable insight into complicated networks and geological structures. Users may build a network of interest starting with one functional object and adding others. Additionally, users can begin with a large network of interest, and see what happens as particular functional objects are removed. Through operation of embodiments of the invention, users can understand how geological objects are related or tied together by locating the parts of a network of interest that are completely disconnected from one another or, similarly, locating parts of the connectivity that would become disconnected components if various features (e.g., functional objects, connection pathways, etc.) were removed. Moreover, users can understand how geological objects are related by locating parts of a network of interest that form a sub-network such that each object of a sub-network is connected to members of certain group.

Various additional processing may be utilized with respect to networks of interest to provide further insight into complicated connectivity networks and geological structures. For example, a hierarchical path classification (e.g., based on distance measurements) may be applied to a network of interest to produce a tree structure in which objects that are most similar to other objects are identified and/or classified. Groups of geological objects that are closely connected within groups, and less connected between groups, may thus be identified and/or classified.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
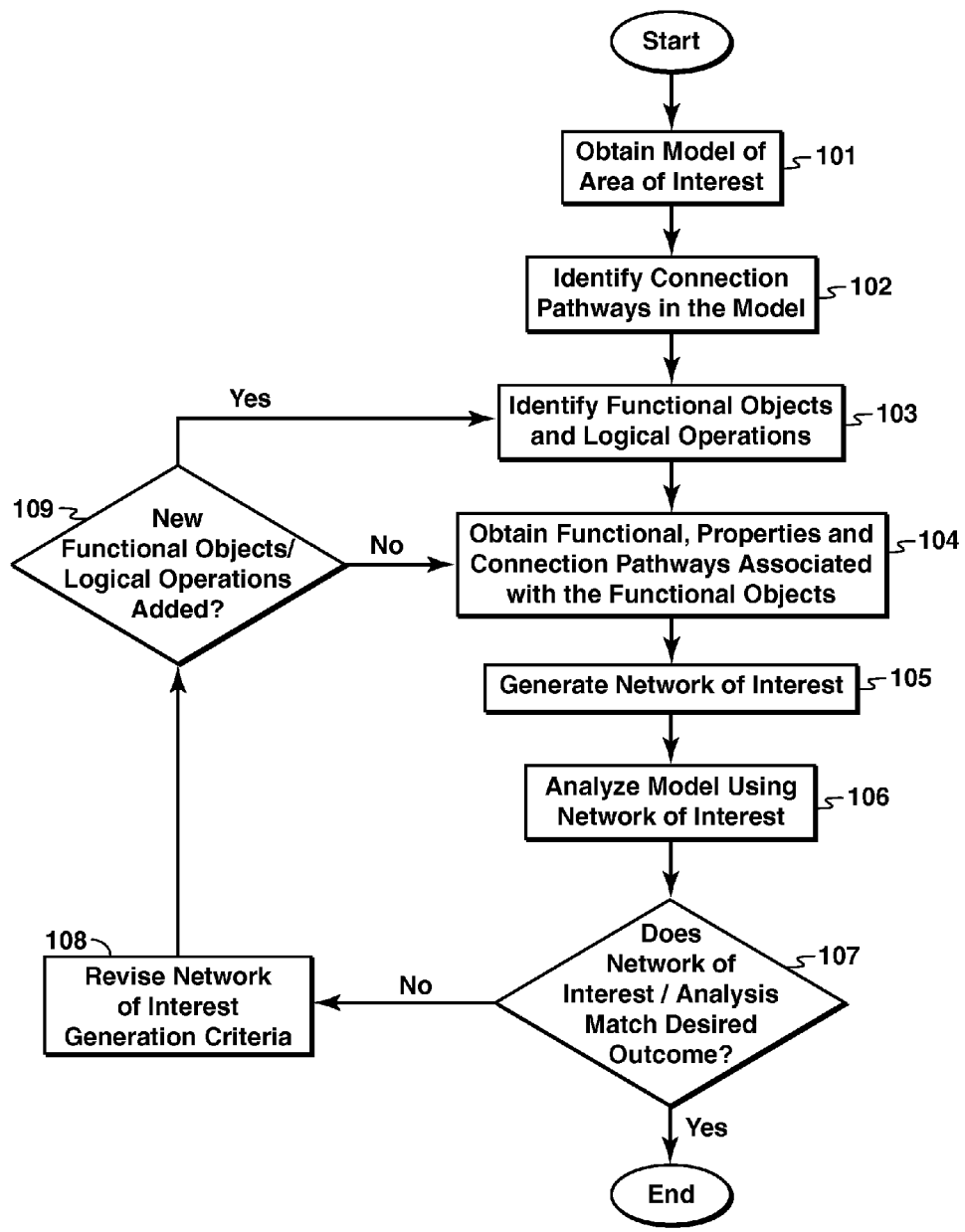
FIG. 1 shows a flow diagram of operation to use functional objects in providing connectivity analysis according to an embodiment of the invention.

Directing attention to FIG. 1, a high level flow diagram of operation to use functional objects in providing connectivity analysis according to an embodiment of the invention is shown. At block 101 of FIG. 1 a model of an area of interest is obtained. The model may comprise a 3D Earth model of a particular subsurface area or region. For example, a 3D Earth model of an area encompassing one or more potential reservoirs may provide a model of an area of interest according to embodiments of the invention used with respect to geologic analysis. Such models may be generated using data provided by data collection techniques such as seismic testing, geologic measurement, reservoir monitoring, simulation, etc. Models utilized according to embodiments of the invention are preferably adapted for display within a modeled space visualization environment, such as a 3D Earth model visualization environment. Models as may be utilized according to embodiments of the invention may be provided by modeling programs such as PETREL, available from Schlumberger Information Solutions, and/or Earth modeling programs such as GOCAD, available from Paradigm Geotechnology BV.

Models utilized according to embodiments of the invention preferably include representations of various features therein. For example, a model of a geologic area of interest may include representations of features such as potential hydrocarbon reservoirs, geologic objects (e.g., layers or strata, faults, regions having particular attributes such as a common media or permeability, crevasses, etc.) and engineering objects (e.g., wells, fractures, etc.). Such features are collectively referred to herein as structural objects.

At block 102 connection pathways are identified in the model. According to embodiments of the invention, the model obtained at block 101 may be obtained having connection pathways previously identified therein, and thus block 102 may be omitted or may be used to provide identification of additional connection pathways. Additionally or alternatively, connection pathways may be identified in the model at a later point in processing, such as with or after identification of functional objects of the present invention.

Figure 2:
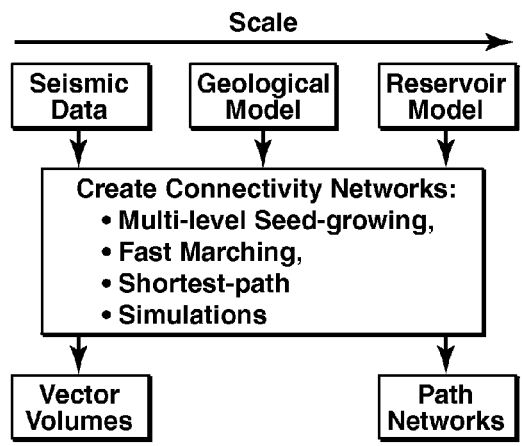
FIG. 2 shows identification of connection pathways according to an embodiment of the invention.

A web of connection pathways may be derived from geologic data sets using various techniques such as volume-based methods (e.g., multi-level seed-growing methods and fast marching methods) and network-based methods (e.g., shortest-path methods). As shown in FIG. 2, the connection pathways may represent connected volumes (e.g., vector volumes) or path networks (e.g., connection polylines). The foregoing connection pathways are preferably adapted for display within the modeled space visualization environment (e.g., 3D Earth model visualization environment) that the underlying model may be displayed within. For example, to facilitate connectivity analysis within the geographic area of interest a 3D Earth model image is displayed with a static connection pathways map thereon.

At block 103 functional objects are identified with respect to the model. Any number of functional objects may be identified according to embodiments of the invention, including identifying a single functional object or identifying a plurality of functional objects. Multiple such functional objects may be selected for use simultaneously (e.g., in a same analysis) or separately (e.g., in different analyses). As will be better appreciated from the discussion which follows, functional objects of embodiments of the present invention are dynamically and interactively utilized and, thus, the particular functional objects identified may change (e.g., additional functional objects identified and/or previously identified functional objects no longer being identified as functional objects). Moreover, functional objects of embodiments of the invention may themselves be manipulated to refine or revise the analysis. For example, dynamic regions associated with functional objects may be resized, reshaped, added, and/or deleted.

Functional objects utilized according to embodiments of the invention are preferably associated with at least one functional attribute of interest. For example, one or more functional objects may provide or otherwise be associated with connectivity with a particular structural object. Similarly, one or more functional objects may be associated with a particular connection pathway or other connection pathway network feature. Functional objects may, by way of example, have a connectivity attribute meeting particular criteria (e.g., meeting a transmission or flow timing threshold in providing connectivity between two structural objects, meeting a flow rate threshold in providing connectivity between two structural objects, etc.).

From the foregoing, it can be appreciated that functional objects of embodiments are associated with functional aspects of the structure of modeled environment or connectivity network of the modeled environment. In the example of geologic analysis, functional objects may be geological based, network based, etc. For example, in the context of hydrocarbon exploration and/or production based geologic analysis, geologic based functional objects may be associated with functional attributes of wells (e.g., perforation intervals, targets, zones, etc.), reservoirs (e.g., horizon surfaces, fault surfaces, flow units, bright spots, property regions, etc.), and/or the like. Further in the context of hydrocarbon exploration and/or production based geologic analysis, network based functional objects may be associated with functional attributes of network topology (e.g., minimum cut, maximum flows, etc.), clusters (e.g., similarity in lexical topology, similarity in semantic topology, etc.), and/or the like.

A region or penumbra may be associated with a functional object of the present invention. Such a region may define an area of uncertainty around or in association with a functional object. For example, a region may be spatially defined about a functional object (e.g., margin area), associated with an area of uncertainty with respect to the spatial limits of the functional object, for facilitating exploring connectivity affected by the functional object. Such regions may be defined by attributes other than space or location, such as being defined by variance of a selected attribute (e.g., flow rate). Functional object regions utilized according to embodiments of the invention may preferably be formed in any desirable size or shape and are dynamically adjustable. For example, a region associated with a functional object may be resized, reshaped, added, and/or deleted as desired, thereby providing a functional object dynamic region.

Functional objects utilized according to embodiments of the invention may be user defined. For example, a user may interact with a visualization environment to select one or more locations within the modeled volume as functional objects. Additionally or alternatively, the user may interact with the visualization environment to select one or more structural objects, connection pathways, network features, etc. as functional objects. As but one example, a user may identify a particular structural object, such as a boundary between sedimentary layers in an Earth model, through which a number of connection pathways pass through and/or pass near. This structural object may be selected by the user as a functional object for use in analyzing the connectivity within the model. An area of uncertainty or dynamic region may be defined in association with the functional object, such as through the user graphically selecting a desired region around the structural object. Additionally or alternatively, the user may define the region mathematically (e.g., defined as within X distance of the structural object's surface), functionally (e.g., defined as the area meeting some functional attribute, such as permeability, interfacing with the structural object), etc.

A user may define functional objects in a number of ways. For example, in a visualization environment, a user may manipulate a pointing device (e.g., mouse, stylus of a digitizing tablet, or touch screen) to select a structural object or identify a location for designation as a functional object. Such graphical selection may be supplemented through the use of data input, such as to provide numeric data to define an area of uncertainty associated with the functional object. Of course, graphical input of such supplemental data may be accommodated, such as to allow a user to draw or "lasso" an area of uncertainty.

Rather than graphically defining a functional object, a user may input data (e.g., textual and/or numerical data) to define a desired functional object. The use of data input to define a desired functional object may be particularly useful with respect to functional objects which are not readily identifiable from a graphical display. For example, a functional object defined by a particular functional characteristic (e.g., media permeability or flow rate) may more easily be selected through data input than graphical selection. Accordingly, embodiments of the present invention facilitate defining of functional objects through a plurality of techniques, including combinations of techniques (e.g., graphical input and data input).

Functional objects, and/or areas of uncertainty or dynamic regions, may additionally or alternatively be automatically defined according to embodiments of the invention. For example, computer based algorithms may operate to identify one or more functional object by identifying structural objects meeting selected criteria, a particular relationship to a structural object, connection pathway network features meeting selected criteria, critical points in a connection pathway network, functional attributes relevant to the analysis to be performed, particular regions in the data volume, particular characteristics, etc.

Irrespective of how a functional object is defined, functional objects of the present invention may preferably be selected/deselected, activated/deactivated, configured/reconfigured, and/or the like. Accordingly, functional objects of embodiments of the invention may be dynamically and interactively manipulated to refine or revise analysis associated therewith.

Data in addition to that useful in identifying functional objects may be provided at block 103. For example, data regarding logical operations or logical relationships between various objects (e.g., the identified functional objects and/or structural objects) may be provided by a user. As will be better understood from the discussion which follows, a user may define logical operations useful in analysis of the modeled area of interest. For example, data regarding logical operations or logical relationships provided at block 103 may comprise logical operators (e.g., "AND", "OR", and "NOT") to be utilized with respect to functional objects and/or structural objects and other data appropriate for defining logical operations. A logical operation defined by such logical operators and other information may thus provide Boolean logic operations with respect to various objects, functions, and attributes.

The foregoing areas of uncertainty or dynamic regions defined in association with a functional object are utilized in performing logical operations according to embodiments of the invention. For example, where a logical operation is determining the connection pathways which interact with a particular functional object, the functional object and its associated area of uncertainty may be used for the determination, such as by identifying all connection pathways which interact (e.g., touch) with the functional object and its area of uncertainty. The logical operations may be performed differently as between the functional object and area of uncertainty, if desired, such as to utilize a weighting factor based upon an uncertainty metric, to utilize a gradient defined with respect to the area of uncertainty, etc.

According to embodiments of the invention, logical expressions such as the foregoing may be utilized to identify functional objects. That is, functional objects of the present invention may be composed in logical expressions, such as to further limit or extend the connectivity among regions of interest.

At block 104 information (e.g., functional attributes) associated with the functional objects is obtained. For example, functional properties (e.g., connectivity properties) associated with functional objects may be determined from the model and associated with the corresponding identified functional object. Similarly, connection pathways associated with functional objects (e.g., connection pathways passing through and/or in communication with a functional object, and its area of uncertainty) may be determined from the model and associated with the corresponding identified functional object. It should be appreciated that information associated with the functional objects may comprise results of various calculations and data processing. For example, embodiments of the present invention operate to associate statistical information, such as summarized statistics on timings, shortest paths, and fastest flows to other regions of interest, with the functional objects.

Functional objects of the present invention may further be annotated at block 104 of embodiments. For example, functional objects of embodiments of the present invention may be annotated with the foregoing associated information or other attributes or properties of the functional objects. According to one embodiment of the invention, functional objects are annotated with object properties (e.g., as 3D iconic graphics, or chartings) in the visualization environment.

Where connection pathways are identified in the model at a later point in processing than illustrated at block 102 discussed above, such identification of connection pathways may be performed at block 104, if desired. Such an embodiment facilitates the generation of only those connection pathways which are associated with identified functional objects and the logical operations performed therewith, thereby reducing the processing power and time utilized in identifying connection pathways.

At block 105, one or more network of interest is generated from the web of connection pathways, the functional objects, and logical operation data (if provided). For example, the connection pathways associated with each functional object may be identified within the model space to thereby provide one or more subsets of connection pathways. Where logical operation data is provided, the appropriate logical operations are preferably applied with respect to the functional objects, structural objects, connection pathways, and/or other attributes to provide one or more subsets of connection pathways in accordance with such logical operations.

Generation of networks of interest according to embodiments of the invention may comprise more than identification of subsets of connection pathways. For example, embodiments of the present invention may perform processing with respect to such connection pathways subsets to derive network topology feature information therefrom, such as to identify critical connections or junctions, to identify interaction between connection pathways, etc.

According to embodiments of the invention, the foregoing subsets of connection pathways, and preferably network topology feature information, are presented to the user graphically in a visualization environment. For example, connection pathways associated with particular subsets may be displayed in the modeled volume as presented in a visualization environment in colors, intensities, line widths, etc. unique to each such subset. Various features within the model, such as connection pathways, structural objects, etc., not associated with the subsets of connection pathways may be hidden from view, reduced in intensity, "grayed out," etc. (collectively referred to as deemphasized) to simplify the visualization environment presentation. Moreover, various ones of the connection pathway subsets, or portions thereof, may be deemphasized, such as when one or more functional objects associated therewith is deactivated, to further simplify the visualization environment presentation.

Figure 4A:
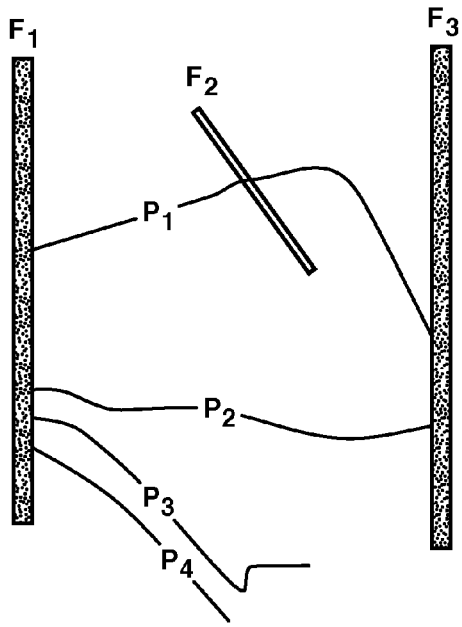
FIG. 4A shows a spatial representation of a network of interest according to an embodiment of the invention.
Figure 4B:
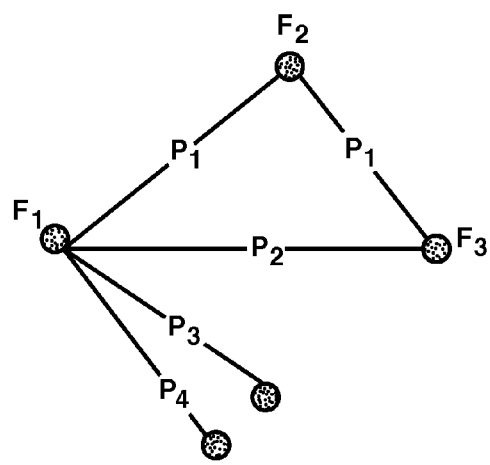
FIG. 4B shows a topological representation of a network of interest according to an embodiment of the invention.

Various representations of connection pathways may be presented graphically according to embodiments of the invention. For example, spatial representations wherein spatial relationships between various objects are represented, topological representations wherein connectivity relationships between various objects are represented, etc. Additionally or alternatively, database and spreadsheet type representations indicating the relationship among objects may be used according to embodiments of the invention. Directing attention to FIGS. 4A and 4B, simplified examples of graphical presentation of connection pathways in a visualization environment are shown. Specifically, FIG. 4A shows a spatial representation of a network of interest with functional objects according to an embodiment of the invention and FIG. 4B shows a topological representation of a network of interest with functional objects according to an embodiment of the invention. Embodiments of the invention may utilize a particular form of graphical representation, such as may be selected based upon the particular analysis being conducted, the particular information available, user selection, etc. Moreover, embodiments of the present invention facilitate provide graphical representations in multiple forms, such as to allow a user to dynamically toggle between various forms of graphical representation.

Referring to FIG. 4A, functional objects $F_1$, $F_2$, and $F_3$ have been defined as described above, wherein functional object $F_1$ comprises an engineering object (e.g., an injection well), functional object $F_2$ comprises a geological object (e.g., a fault), and functional object $F_3$ comprises an engineering object (e.g., a production well). Assuming that "T" is a task of finding all connection pathways contacting a given functional object and the subject connection pathways are represented by connection pathways $p_1$, $p_2$, $p_3$, and $p_4$, then $F_1(T)=\{p_1, p_2, p_3, p_4\}$, $F_2(T)=\{p_1\}$, and $F_3=\{p_1, p_2\}$. The results of task "T" are graphically represented in the spatial representation of FIG. 4A, it being appreciated that additional, deemphasized connection pathways (e.g., $p_5, \ldots p_n$) may be present in the modeled environment. Accordingly, a user may readily view, analyze, and/or interact with such a representation of the network of interest as described herein.

Referring now to FIG. 4B, functional objects $F_1$, $F_2$, and $F_3$ and connection pathways $p_1$, $P_2$, $P_3$, and $p_4$ discussed above are shown in a topological representation. Assuming functional objects $F_1$ and $F_3$ are wells (e.g., injection well and production well) and functional object $F_2$ is a sealed fault, a user can readily appreciate that the only connection pathway from functional object $F_1$ to functional object $F_3$ is connection pathway $p_2$.

At block 106 the model is analyzed using the generated network(s) of interest. For example, a user may view the model in a visualization environment, having one or more subsets of connection pathways associated identified using functional objects of the present invention thereon, to readily appreciate particular connectivity attributes of the area of interest modeled. The user may further interact with the functional objects to access information and/or annotations associated therewith. Such interaction may comprise the user activating and/or deactivating various functional objects to deemphasize particular connection pathways, to view different information, to analyze different regions of interest, to analyze different connectivity properties, etc. Further, the properties of the functional objects and/or their interaction with the connection pathways may be explored to identify most critical connections interactively.

At block 107 a determination is made as to whether the analysis provided the desired outcome. For example, the user may determine whether the desired information is provided with respect to the functional objects and subsets of connection pathways associated therewith. If the desired outcome has been achieved, processing according to the illustrated flow diagram ends. However, if the desired outcome has not been achieved, processing proceeds to block 108.

At block 108 of the illustrated embodiment the network of interest generation criteria is revised. For example, functional objects may be added, deleted, resized, reshaped, and/or repositioned within the model volume in order to change the subset of connection pathways identified, to revise a functional attribute of the analysis, to explore interaction of connection pathways and/or structural objects, etc. Similarly, areas of uncertainty or dynamic regions associated with functional objects may be resized, reshaped, added, and/or deleted to change the resulting analysis. Likewise, data regarding logical operations or logical relationships between various objects may be added, deleted, or otherwise revised to change the resulting analysis. For example, a functional object of the present invention can be repositioned (such as moving to a critical point in a network) and/or reshaped (such as modifying a well path trajectory) to investigate other possible connections.

At block 109 a determination is made as to whether new functional objects or logical operations are being added. If so, processing proceeds to block 103 to facilitate identification of the new functional objects and/or logical operations. However, if no new functional objects and/or logical operations are being added, processing according to the illustrated embodiment proceeds to block 104 wherein information associated with the functional objects is obtained and annotations for the functional objects made as described above.

From the above, it can be appreciated that embodiments of the present invention provide an interactive and iterative process for connectivity analysis. Accordingly, during analysis sessions (such as well path planning, production operation, or migration study), functional objects may be added, deleted, activated, or deactivated and the appropriate connections among the regions of interest modeled and displayed. Functional objects can also be repositioned or reshaped during analysis sessions in order to investigate other possible connections.

Figure 3:
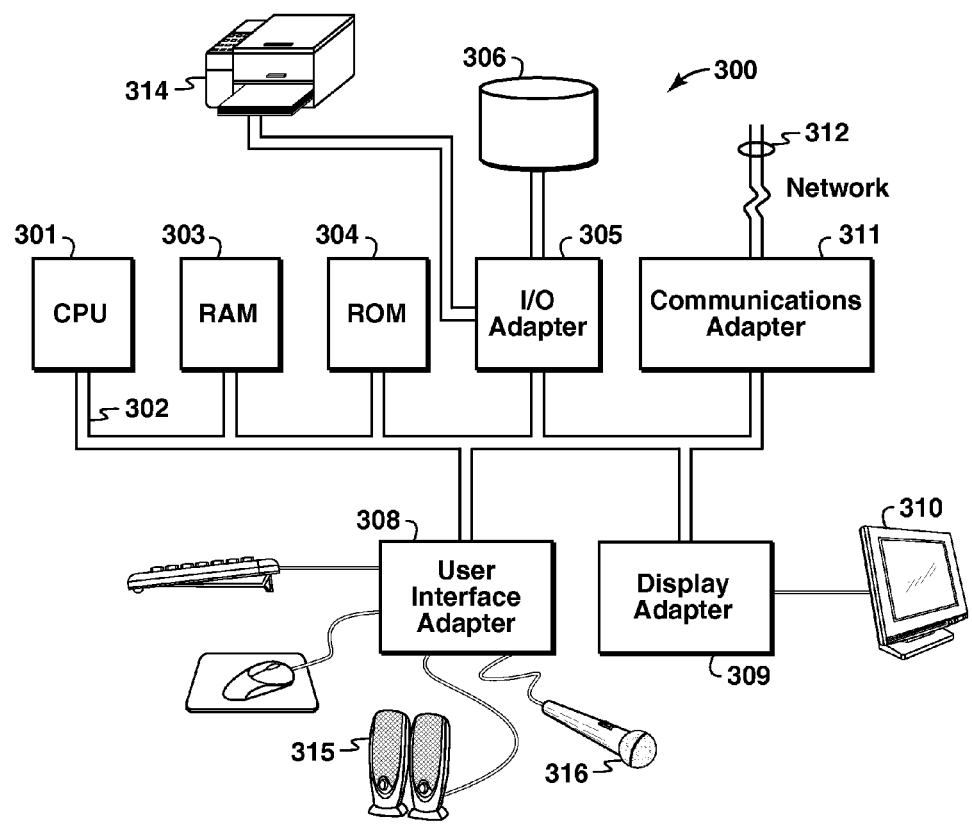
FIG. 3 shows a computer system adapted for use according to an embodiment of the present invention.

FIG. 3 illustrates computer system 300 adapted for use according to an embodiment of the present invention. Computer system 300 of the illustrated embodiment includes central processing unit (CPU) 301 coupled to system bus 302. CPU 301 may be any general purpose CPU, such as a processor from the PENTIUM family of processors available from Intel Corporation or a processor from the POWERPC family of processors available from the AIM alliance (Apple Inc., International Business Machines Corporation, and Motorola Inc.). However, the present invention is not restricted by the architecture of CPU 301 as long as CPU 301 supports the inventive operations as described herein. Although a single processor configuration is represented in FIG. 3, computer systems utilized according to embodiments of the invention may comprise networked multi-processor systems.

Bus 302 of the illustrated embodiment is coupled to random access memory (RAM) 303, such as may comprise SRAM, DRAM, SDRAM, flash memory, and/or the like. Read only memory (ROM) 304, such as may comprise PROM, EPROM, EEPROM, and/or the like, is also coupled to bus 302 of the illustrated embodiment. RAM 303 and ROM 304 hold user and system data and programs as is well known in the art. Bus 302 is also coupled to input/output (I/O) controller 305, communications adapter 311, user interface adapter 308, and display adapter 309.

I/O controller 305 connects to storage device 306, such as may comprise one or more of a hard disk, an optical disk (e.g., compact disk (CD) or digital versatile disk (DVD)), a floppy disk, and a tape, to the computer system. I/O controller 305 of the illustrated embodiment is also connected to printer 314, which allows the system to print information such as documents, photographs, etc. Such a printer may be a traditional printer (e.g. dot matrix, laser, etc.), a fax machine, a copy machine, and/or the like.

Communications adapter 311 is adapted to couple computer system 300 to network 312 to provide communications to and/or from external systems, devices, networks, etc. Network 312 may comprise the public switched telephone network (PSTN), a local area network (LAN), a metropolitan area network (MAN), a wide area network (WAN), an extranet, an intranet, the Internet, a cellular network, a cable transmission network, and/or the like.

User interface adapter 308 of the illustrated embodiment couples various user input devices to the computer system. For example, keyboard 313, pointing device 307, and microphone 316 may be coupled through user interface adapter to accept various forms of user input. Similarly, speakers 315 may be coupled through user interface adapter to provide user interface output.

The display adapter 309 provides an interface to display 310. Accordingly, CPU 301 may control display of various information, including text, graphics, and images upon display 310 through display adapter 309. Display 310 may comprise a cathode ray tube (CRT) display, a plasma display, a liquid crystal display (LCD), a projector, and/or the like. Although not expressly shown in the illustrated embodiment, display 310 may provide for input of data as well as output of data. For example, display 310 may comprise a touch screen display according to embodiments of the invention.

When implemented in software, elements of embodiments of the present invention are essentially code segments operable upon a computer system, such as computer system 300, to perform the necessary tasks. The program or code segments can be stored in a computer readable medium, such as RAM 303, ROM 304, and/or storage device 306. Additionally or alternatively, the code segments may be downloaded via computer networks, such as network 312.

As previously mentioned, embodiments of the invention preferably utilize a 3D representation of the 3D Earth model on a computer, such as computer system 300, with visualization capabilities. A commercial software product providing 3D representation of 3D Earth models as may be adapted for use with functional objects according to the present invention is the GOCAD geologic and seismic interpretation program available from Paradigm Geotechnology BV. Data input to such software adapted in accordance with embodiments of the invention may include geologic raw and interpreted data (e.g., well path/curves, horizon surfaces, faults, seismic data, etc.), engineering raw and interpreted data (e.g., well completion intervals, well perforation zones, etc.), a geologic model with associated properties (e.g., horizons, porosity, horizontal permeability, vertical permeability, net to gross, facies, fluid saturations, etc.), and a simulation model and associated properties (e.g., horizons, porosity, horizontal permeability, vertical permeability, fluid saturations, fluid rates, fluid ratios, fluid cumulative, reservoir pressure, well pressures, etc.).

Software adapted according to embodiments of the invention facilitates the identification or defining of functional objects as described herein, such as based on existing geological objects, dynamic regions of interests on modeling grid/volume data sets, critical nodes of the connectivity networks, etc. Using such functional objects in combination with computational implementation of algorithms, software adapted according to embodiments of the invention interact with data input thereto (e.g., the aforementioned geologic data, engineering data, geologic model, and simulation model) to model and investigate the connectivity. Such modeling and investigating connectivity may comprise volume-based methods (e.g., multi-level seed-growing, fast marching for modeling connectivity; etc.), network-based methods (e.g., shortest-path for modeling connectivity; etc.), network analysis to understand network topology and flow mechanisms, network search algorithms based on statistical properties of connected path, link topology of the objects and/or semantic topology of the objects, spatial logic operations of possible pathways for reducing or extending the connections among objects, and/or the like.

An example of a spatial logic operation for a connectivity network as may be utilized in modeling and investigating connectivity according to embodiments of the present invention follows. A connectivity network, $G=(V, E)$, includes a set of vertices objects, $V=\{v_1, v_2, \ldots\}$, and a set of edge objects, $E=\{e_1, e_2, \ldots\}$, such that each edge $e_k$ is identified with a pair $(v_i, v_j)$ of vertices. The vertices $v_i$ and $v_j$ are called the end-vertices of edge $e_k$. Two edges are called equal if an only if they have the same end-vertices and their paths has the same spatial location in 3D space. A network of interest, $G_k$, is called the k-th sub-network of a network, G, if all vertices and all the edges of $G_k$ are in G, and each edge of $G_k$ has the same end vertices. Assume that $F_1, F_2, \ldots F_n$ are functional objects and that $T_1, T_2, \ldots T_m$ are tasks defined for the functional objects. Each task $T_i$ invokes an operation to create a sub-network $G_i$ from G, such that $G_{ij}=F_i(T_j)$ is denoted as a sub-network created by functional object $F_i$ using task $T_j$.

In the foregoing example of a spatial logic operation, some logic operations (e.g., AND, OR, NOT) as may be implemented by the tasks are shown below. $G_i$ AND $G_j$ denotes a sub-network, $G_s$, of a network, G, such that each edge, e, in $G_s$ is also in $G_i$ and $G_j$. The vertices of $G_s$ are the end-vertices of all edges in $G_s$. $G_i$ OR $G_j$ denotes a sub-network, $G_s$, of a network, G, such that each edge, e, in $G_s$ is also in $G_i$ or $G_j$. The vertices of $G_s$ are the end-vertices of all edges in $G_s$. NOT $G_i$ denotes a sub-network, $G_s$, of a network, G, such that each edge, e, in $G_s$ is in G but not in $G_i$. The vertices of $G_s$ are the end-vertices of all edges in $G_s$.

Having generally described the concepts of the present invention and embodiments thereof, several example implementations are provided below to aid in understanding the concepts discussed herein. Specifically, exemplary operation to evaluate connection pathways from one well to another well and exemplary operation to evaluate connectivity analysis from multiple models according to embodiments of the present invention are shown.

Figure 5:
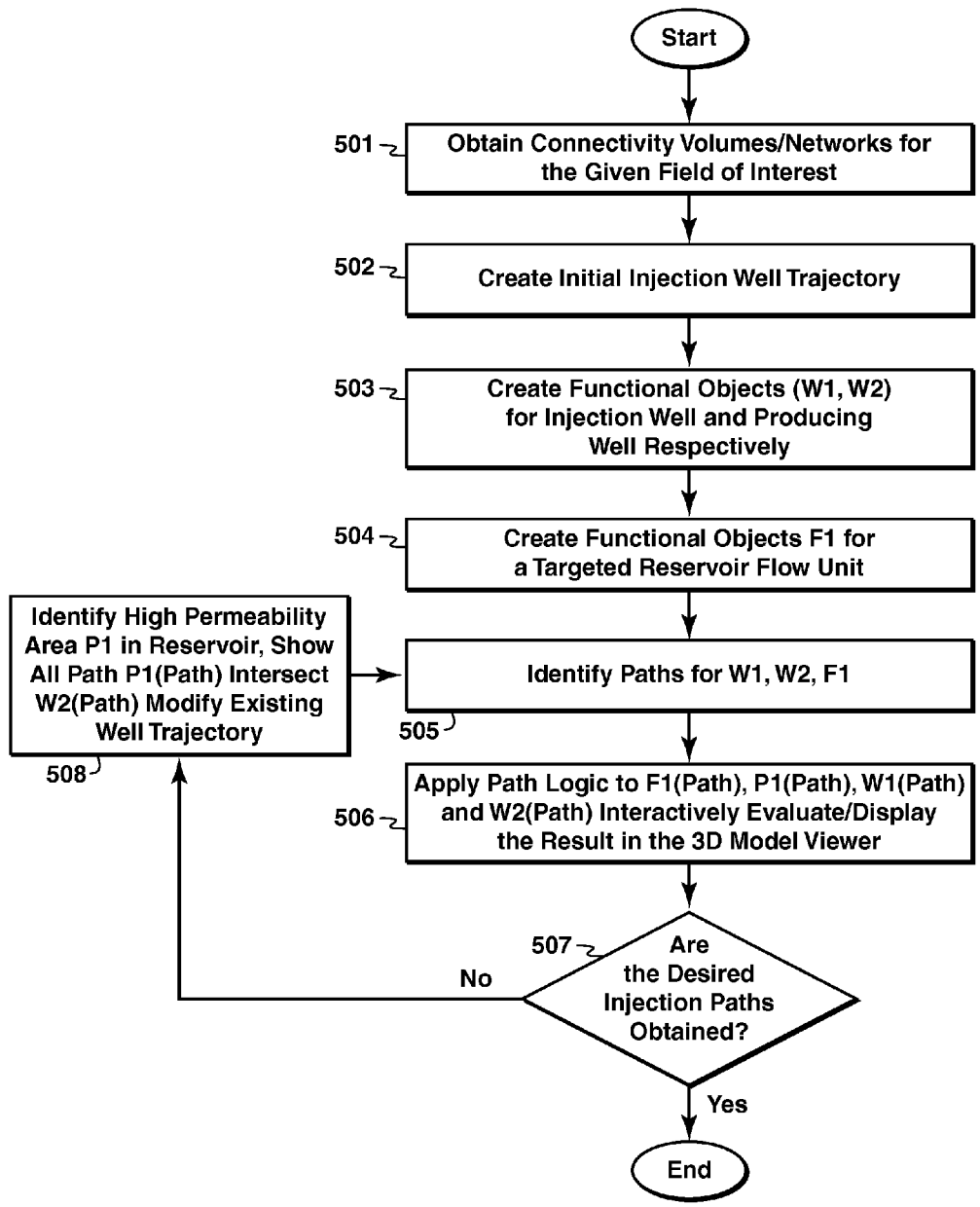
FIG. 5 shows a flow diagram of operation of an example implementation for planning an injection well for a given production well according to an embodiment of the invention.

FIG. 5 shows a flow diagram of an exemplary implementation to evaluate connection pathways from one well to another well. Geoscientists/engineers often desire to optimize injection efficiency of injection and production pair of wells and understand the pathways along the way. Accordingly, the implementation of FIG. 5 may be utilized in the case of planning an injection well.

At block 501, a three-dimensional representation of the subsurface (e.g., 3D Earth model) and connectivity volume and/or network data (connection pathways) for a given geological area of interest are obtained. The data in the model may comprise geological objects, such as horizons, faults, and hydrocarbon reservoir model data volume, as well as engineering objects, such as existing production wells and fractures. Attributes of the volume represents the permeability, porosity or the transmissibility of the reservoir.

At block 502, an initial planned injection well is created in the model. Functional objects of the present invention are created or identified at blocks 503 and 504. For example, at block 503 of the illustrated embodiment, functional objects $W_1$ and $W_2$ corresponding to an injection well and production well, respectively, defined in the model are created. At block 504 of the illustrated embodiment, functional object $F_1$ corresponding to a targeted reservoir flow unit is created.

At block 505, the connection pathways associated with (e.g., interfacing with) the functional objects are identified. For example, based on the given data set and geological objects, a connectivity volume and networks are identified. The connection pathways between any two selected objects can be readily available from the networks of interest. It should be appreciated that, although various numbers of functional objects may be created, functional objects may be selected and deselected to thereby interactively alter the connection pathways identified or presented (e.g., not deemphasized) at any particular time.

At block 506 tasks, such as may implement various logical operations, are applied with respect to the functional objects to identify various sub-networks of interest. For example, logical operations may be applied with respect to the pathways identified above. Implement of tasks, and/or the application of logical operations, may be interactive such that a user can try various task definitions and/or logical operations to see the associated results, as are preferably displayed in a visualization environment. The user may evaluate the various sub-networks displayed, preferably with various annotations associated therewith, to determine if the initial injection well trajectory provides the desired results.

At block 507 of the illustrated embodiment, a determination is made as to whether the desired injection well results are indicated by the model. If yes, processing according to the illustrated embodiment ends. If no, processing proceeds to block 508 where the user interacts with the model environment to alter the modeled results. For example, in the illustrated embodiment, the user may identify a high permeability area, $P_1$, in the reservoir as a functional object, thereby identifying all connection pathways associated therewith. The user may use this information to modify the trajectory of the injection well, and thus the functional object associated therewith. Processing may proceed again to block 505 where connection pathways associated with the functional objects are identified as discussed above.

It should be appreciated that analyzing all connection pathways, with their associated properties, within the modeled volume is likely to be challenging and impractical. However, the goal in the foregoing example is to investigate the communication between the planned injected well (Well 1) and the production well (Well 2), and evaluate the effect of the flow paths on a particular flow units (Flow 1) in the modeled reservoir. Thus functional objects $W_1$, $W_2$, and $F_1$ are created for the given objects respectively and a plurality of functions are used to identify sub-networks of interest. In particular, a path function obtains all the connection pathways which intersect any given object and a property function obtains the statistical summary of the properties, such as porosity and timing, of the paths for any given object. During well planning sessions in the foregoing exemplary implementation, a well trajectory for the injection well (Well 1) is obtained by interactively moving the target locations or changing the methods and criterions of the path algorithms. Using the foregoing functions, a subset of connection pathways, and summary of the path properties related to the production well (Well 2) are displayed in the visualization environment. Using path logic, the user can examine the effect of the current well trajectory to the result of the connectivity to the producing well. For example, the user can quickly identify the leak paths, and immediately move the current trajectory to a better location. One or more optimization process can also be utilized according to embodiments of the invention, such as to automatically seek the best well trajectory.

Figure 6:
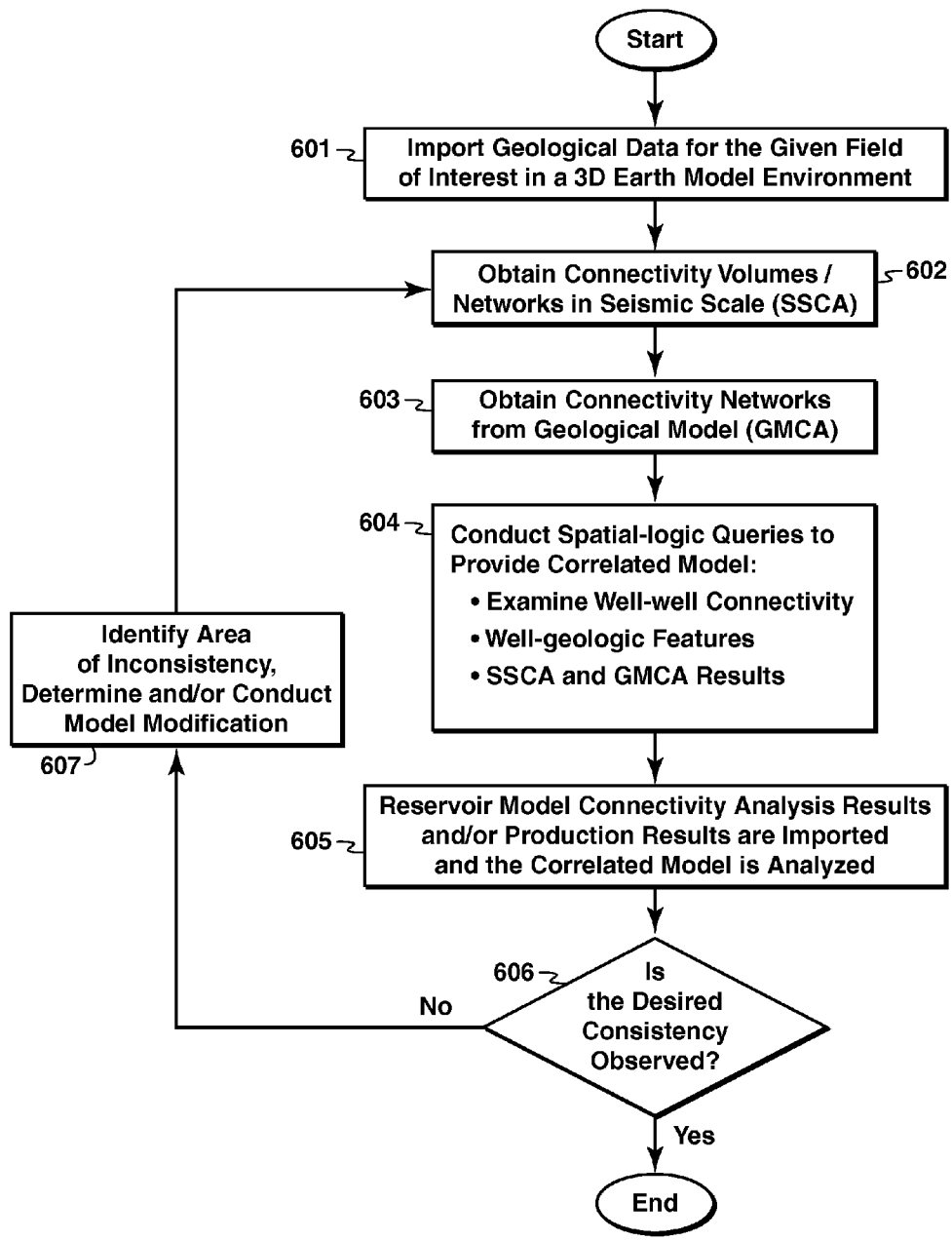
FIG. 6 shows a flow diagram of operation of an example implementation for connectivity analysis from multiple models according to an embodiment of the invention.

FIG. 6 shows a flow diagram of an exemplary implementation to evaluate connectivity analysis from multiple connectivity analyses. Subsurface models are often generated several times during an assets life cycle. These models are frequently based upon different data and are at different scales, therefore the connectivity architecture/pathways may be different based upon the model/data that is used or different parameters. This exemplary implementation of FIG. 6 facilitates the comparison of the connectivity analysis results from different scales, such as seismic, geologic model scale, and reservoir simulation.

At block 601, three-dimensional representations of the subsurface are obtained which represent the geological area of interest. The illustrated embodiment obtains connectivity volumes and/or networks for each of a plurality of model scales. Specifically, block 602 of the illustrated embodiment obtains connectivity volumes and/or network data (connection pathways) in a seismic scale while block 603 of the illustrated embodiment obtains connectivity volumes and/or network data (connection pathways) in a geological model scale. The data in the model may comprise geological objects, such as horizons, faults, and hydrocarbon reservoir model data volume, as well as engineering objects, such as existing production wells and fractures. Attributes of the volume represents the permeability, porosity or the transmissibility of the reservoir.

The data in the models may comprise geological objects, such as horizons, faults, and hydrocarbon reservoir model data volume, as well as engineering objects, such as existing production wells and fractures. Although each such model may include representations of same particular structures, variations in scale, time of data collection, modeling parameters, etc. may result in a same structure in each model directly corresponding to one another. Of course, other sources of model data may be utilized in addition to or in the alternative to that shown in the illustrated embodiment, if desired.

At block 604, spatial-logic queries are conducted to rationalize the correlation of objects in the models. For example, well to well connectivity and well to geologic feature (surfaces, geobodies, etc.) connectivity may be examined and compared between the models to identify correlation of objects within the models. Since the models of embodiments are at different scales, the resulting pathways may not occupy the same spatial coordinates. Accordingly, proximity based techniques for identifying object correlation are implemented according to embodiments of the invention to allow the differing results to be visually isolated, such as for additional analysis.

At block 605 of the illustrated embodiment, reservoir model connectivity analysis results and/or production results are imported for analyzing the correlated model. For example, using the aforementioned spatial-logic query tools results from the individual models can be analyzed with respect to results from the correlated model to insure that multiple connectivity analyses are consistent with geologic and engineering data.

At block 606, a determination is made with respect to whether the desired consistency between individual models and the correlated model is observed. If so, processing according to the illustrated embodiment ends. If not, processing according to the illustrated embodiment proceeds to block 607.

At block 607, areas of inconsistency between the results of the individual models and the correlated model are identified. Thereafter, modifications to the correlated model may be determined and/or conducted in an attempt to achieve the desired consistency. For example, embodiments may operate to modify a correlated model by determining changes to conditions of one or more of the related models and/or determining changes to the criteria of generating connections of one or more of the models. Processing according to the illustrated embodiment the returns to block 602 for processing as discussed above, thereby providing an iterative multiple model connectivity analysis implementation.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:
1. A method comprising:
providing a subsurface geologic model of a geologic area of interest, said model including representations of objects within said geologic area of interest;
defining one or more functional objects within said model;
identifying a set of fluid reservoir connection pathways within said model associated with said one or more functional objects;

identifying one or more fluid reservoir connection pathways not associated with said one or more functional objects;

analyzing fluid connectivity within said geologic area of interest with respect to said one or more functional objects using said set of fluid reservoir connection pathways; and presenting said set of fluid reservoir connection pathways to be readily identifiable visually in said visualization environment, relative to said one or more reservoir connection pathways not part of said set of said fluid reservoir connection pathways.

2. The method of claim 1, wherein said one or more functional objects comprise a set of structural objects within said geologic area of interest selected as being relevant to a functional attribute of said geologic area of interest to be analyzed.

3. The method of claim 2, wherein said structural objects comprise a geologic object of said objects.

4. The method of claim 2, wherein said structural objects comprise an engineering object of said objects.

5. The method of claim 1, wherein said defining one or more functional objects comprises:
defining a dynamic region in association with a functional object of said one or more functional objects.

6. The method of claim 5, wherein said dynamic region comprises an area of uncertainty with respect to at least one attribute of said functional object.

7. The method of claim 1, wherein at least one functional object of said one or more functional objects has information associated therewith regarding at least one functional attribute of said geologic area of interest, and wherein said analyzing fluid connectivity within said geologic area of interest with respect to said one or more function objects is further with respect to said at least one functional attribute.

8. The method of claim 1, wherein said identifying a set of fluid reservoir connection pathways comprises:
applying logic operations with respect to said one or more functional objects.

9. The method of claim 1, wherein said analyzing fluid connectivity within said geologic area of interest comprises:
dynamically manipulating at least one functional object of said one or more functional objects to thereby alter said set of fluid reservoir connection pathways.

10. The method of claim 9, wherein said dynamically manipulating said at least one functional object comprises:
changing a size of said at least one functional object.

11. The method of claim 9, wherein said dynamically manipulating said at least one functional object comprises:
changing a shape of said at least one functional object.

12. The method of claim 9, wherein said dynamically manipulating said at least one functional object comprises:
changing a position of said at least one functional object.

13. The method of claim 9, wherein said dynamically manipulating said at least one functional object comprises:
changing an area of uncertainty associated with said at least one functional object.

14. The method of claim 9, wherein said dynamically manipulating said at least one functional object comprises:
deselecting said at least one functional object.

15. The method of claim 14, further comprising de-emphasizing, in said visualization environment, fluid reservoir connection pathways associated with said deselected functional object.

16. The method of claim 1, wherein said analyzing fluid connectivity within said geologic area of interest comprises:
dynamically changing a logical operation associated with at least one functional object of said one or more functional objects to thereby alter said set of fluid reservoir connection pathways.

17. The method of claim 1, further comprising producing hydrocarbons from said geologic area of interest from at least one of the functional objects that is associated with one or more of said plurality of fluid reservoir connection pathways.

18. A method comprising:
providing a first subsurface geologic model of a geologic area of interest, said first model including representations of structural objects within said geologic area of interest and having a first plurality of fluid reservoir connection pathways defined therein;

providing a second subsurface geologic model of said geologic area of interest, said second model including representations of at least a portion of said structural objects and having a second plurality of fluid reservoir connection pathways defined therein; and correlating points within said first model with corresponding points in said second model using said structural objects and said fluid reservoir connection pathways to thereby provide a correlated model of said geological area of interest.

19. The method of claim 18, further comprising:
identifying an area of inconsistency between said first model and said second model; and modifying at least one aspect of said correlated model as a function of said area of inconsistency.

20. The method of claim 18, further comprising:
defining one or more functional objects within said correlated model;

identifying a subset of fluid reservoir connection pathways of said correlated model associated with said one or more functional objects; and analyzing connectivity within said geologic area of interest using said subset of fluid reservoir connection pathways.

21. The method of claim 20, further comprising:
de-emphasizing, in a visualization environment, fluid reservoir connection pathways of said correlated model not part of said subset of fluid reservoir connection pathways to thereby present said subset of fluid reservoir connection pathways in said visualization environment so as to be readily identifiable visually.

* * * * *